Oct. 22, 1929.  L. H. CHURCH  1,732,927
CABLE CONNECTER
Filed Nov. 12, 1926
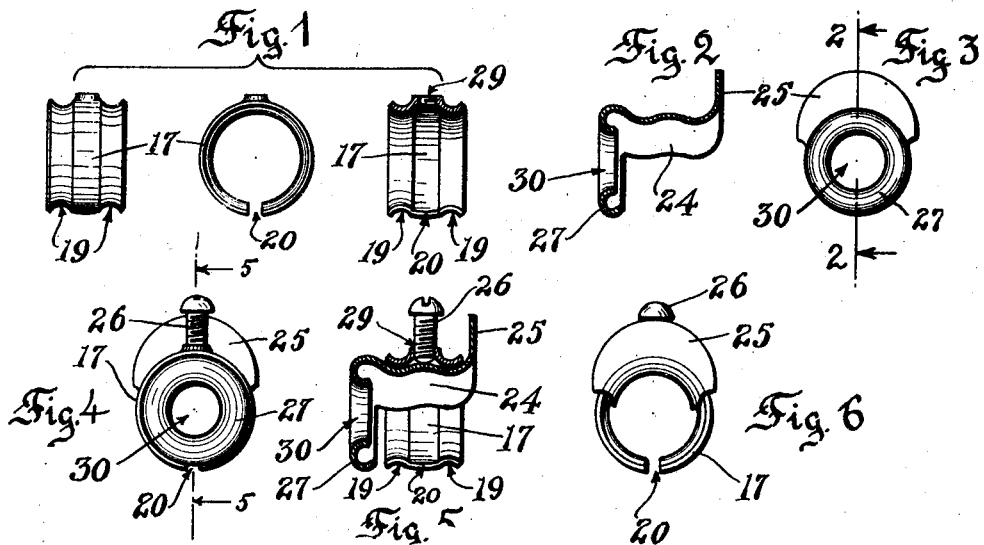
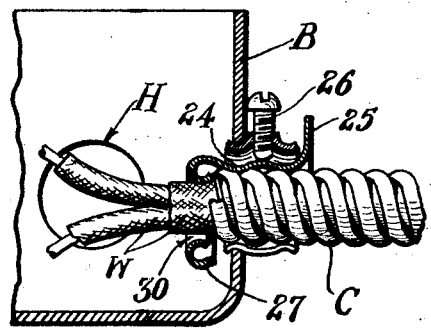
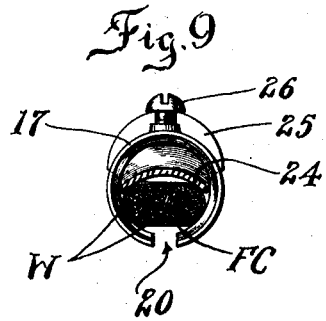
INVENTOR
Lewis H. Church
BY
ATTORNEYS Patented Oct. 22, 1929

1,732,927

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed November 12, 1926. Serial No. 148,072.

The invention relates to cable connecters and particularly to adapter connecters capable of universally anchoring cable of all sizes and shapes to electric fixture or outlet boxes.

The object of the present invention is the provision of an adapter connecter capable of anchoring armored cable to boxes, which shall close that portion of the box hole or knock-out opening not occupied by the cable, and guard the wires against abrasion by the sharp edges of the severed ragged end of the metallic cable; and to prevent direct engagement of the screw operating means against the armored cable.

According to the present invention, an adapter, movably mounted on the connecter member, includes a cable clamp plate provided at one end with a shutter to close that portion of the box hole not occupied by the cable and provided at the other end with a bushing serving as a stop for the cable and protective means for the insulation on the wires. The bushing may contribute to the closing of the box hole and the connecter passage. The shutter and the bushing are preferably formed upon opposite ends of a clamp plate, at substantially right angles thereto, and extending in opposite directions therefrom. They also serve to prevent axial displacement of the adapter and guide the same in movable relation in or to the connecter member to maintain said adapter in working alignment with the operating means.

For a further understanding of the invention, reference will be had to the following description, taken in connection with the accompanying drawings illustrating an example of the invention.

Figure 1 represents a group of views, in side and end elevation and in longitudinal section, showing one type of connecter member as a frame or base on which the movable parts are to be mounted.

Figures 2 and 3 show an example of the adapter, Figure 2 being a section on the line 2—2, and Figure 3 an end elevation of the bushing end.

Figure 4 is an end elevation of the assembled connecter looking from the end carrying the bushing.

Figure 5 is a longitudinal sectional view taken on the line 5—5 in Figure 4.

Figure 6 shows the assembled adapter connecter looking from the shutter end.

Figure 7 is a longitudinal section, showing the adapter connecter mounted in an electric fixture box, with an armored cable secured therein; and Figure 8 is an outside view thereof.

Figure 9 is an end view of the connecter with the bushing removed looking toward the shutter end with a flat armored cable secured within a connecter.

Electric outlet boxes B are manufactured with knock-out openings or holes H to receive the cable C and connecters, and by the use of the improved connecter the armored cable C is anchored in the box B and electrical wiring connections are made inside the box with the wires W coming from the cable.

The cable connecter may comprise a connecter member 17 of any suitable form on which to mount the movable parts to complete a connecter, and preferably may be formed of resilient metal, in sleeve form, having box hole anchorage grooves 19 proximate the ends. The ends of the stamping, from which the connecter member is formed, come together to form a longitudinal split 20 which permits the connecter member to be contracted, that is, its circumference reduced, for insertion in a box hole H. The box hole edge is engaged, upon expansion of the connecter member 17, within one of the grooves 19, as shown in Figure 7, to effect anchorage of the connecter member 17 in a box hole. While a grooved sleeve type part 17 is shown, other forms of connecter members and anchorage means may be used.

The sleeve 17 is thus adapted to receive an armored cable C. Within or upon this connecter is mounted an adapter comprising a cable clamp plate 24 whereof one end is turned upwardly, at substantially a right angle, to form a shutter 25. The other end of the plate 24 is also turned substantially at right angles, but in the opposite direction, and forms a bushing 27 serving as a stop for the armored cable to prevent its entering the interior of the box and also protecting the wires W against abrasion by the sharp edges of the severed armor, the wires passing through the bushing aperture 30 into the interior of the box.

The shutter 25 is of such dimensions as to close the end of the sleeve 17, or that portion thereof not occupied by the cable C, and to close the box hole H against the admission of dirt or plaster into the interior of the electric fixture box B. The bushing 27 may contribute to this closing of the box hole H and thus both shutter 25 and bushing 27 form what may be referred to as shutter or closure ends. The shutter 25 and the bushing 27 also serve as positioning means to prevent axial displacement of the adapter 24—25 and as guiding means therefore as it is moved toward or away from the cable C and with respect to screw operating means 26 which is threaded through a screw hole 29 formed in the connecter member to drive the clamp plate 24 against the armored cable C and clamp it in the connecter and anchor the connecter in the box hole H.

Preferably, the bushing 27 may have rolled edges, that is, it is rolled into a partly cylindrical or curled annular shape to present smooth curvilinear edges over which the wires W may be bent in making the electrical connections within the fixture box B so that neither the wires nor their insulation will be abraded by sharp edges. It is to be noted that this construction affords a full-fashioned bushing, i. e. one which is completely circular in formation and not split or mutilated.

It will thus be seen that the adapter connecter has provision for shielding electric wires W against abrasion by the edge of armored cable and is applicable with either round armored cable C, in Figures 7 and 8, or flat armored cable FC, in Figure 9, while the interior of the electric fixture box B is closed against the admission of dirt or plaster by the shutter 25 and the bushing 27, all in a construction which is simple of manufacture and easy to assemble.

It will be observed that my invention presents a novel adapter wherein a bushing and a shutter are spaced apart in offset parallel relation and integral at their proximate edges with a clamp plate; and a connecter member with operating means is mounted for full lateral motion between the shutter and bushing.

Various modifications may be made in the type of connecter member and clamp plate operating means with which the adapter of the present invention is associated.

What I claim is:

1. A connecter comprising, a member including box hole edge anchorage means, a bushing transversely movable with respect to one end of the member, means for retaining said bushing in position on the member including a freely movable part disposed at the other end of the member and which also slides transversely thereof, and operating means to move the bushing and movable part and clamp them against a cable.

2. A connecter comprising, a sleeve including box hole edge anchorage means, a bushing transversely movable with respect to one end of the sleeve, means for retaining said bushing in operative relation with respect to the sleeve including a freely movable part disposed at the other end of the sleeve and which slides transversely thereof, and operating means to exert clamping pressure against a cable.

3. A connecter comprising, a member including box hole anchorage means, a box hole shutter movably carried with the member, a bushing carried with the shutter, and operating means to exert clamping pressure against a cable and hold the shutter closed.

4. A connecter comprising, a member including box hole anchorage means; a clamp plate movably carried with the member, having a shutter adapted to close the box hole, and a bushing; and operating means to apply pressure to the clamp plate and hold the shutter closed.

5. A connecter comprising, a member including box hole anchorage means, a clamp plate movably mounted on the member, a shutter carried on each end of the clamp plate at an angle thereto and extending in opposite directions, one of said shutters being formed with a passage for a cable, and clamp plate operating means.

6. A connecter comprising, a member including box hole anchorage means; a cable clamp plate movably carried with the member and having a shutter at one end adapted to close the box hole and a bushing at the other end to stop the cable and protect its wires; and operating means to move the clamp plate against a cable and thereby retain the shutter in box hole closing position.

7. A connecter comprising, a sleeve including box hole anchorage means; a cable clamp plate movable in the sleeve, including a shutter at one end to close the sleeve, and including a bushing at the other end to stop the cable and protect the wires, and operating means to actuate the clamp plate.

8. A connecter comprising, a sleeve including resilient box hole anchorage means; a cable clamp plate movable in the sleeve carrying a shutter at one end extending at an angle thereto to close the sleeve end and a bushing at the other end at an angle thereto but extending in a direction opposite to that of the shutter to protect wires; and screw operating means to actuate the cable clamp plate and render effective the box hole anchorage means.

9. A connecter comprising, a lengthwise split sleeve provided with a box hole anchorage groove; a cable clamp plate in the sleeve, including a shutter at one end and outside the sleeve to close one sleeve end, and a bushing, formed with rolled edges, at the other end outside the sleeve extending in a direction opposite to the shutter; and an operating screw carried with the sleeve to engage the clamp plate and expand the anchorage groove.

10. A connecter comprising; an adapter, including a bushing and a shutter disposed in parallel offset spaced relation, a clamp plate integral at its ends with the proximate edges of the shutter and bushing; a lengthwise split sleeve having a box hole anchorage groove at each end adjacent the shutter and the bushing and freely mounted between the shutter and bushing; and operating means mounted on the sleeve between the anchorage grooves to bear on the clamp plate, to hold the shutter closed, and to expand the anchorage grooves.

In testimony whereof I affix my signature.

LEWIS H. CHURCH.